Oct. 15, 1968  R. H. LIVA  3,405,564
PULLEY

Filed Oct. 13, 1966  3 Sheets-Sheet 1

INVENTOR.
ROBERT H. LIVA
BY
ATTORNEYS

Oct. 15, 1968  R. H. LIVA  3,405,564

PULLEY

Filed Oct. 13, 1966  3 Sheets-Sheet 2

INVENTOR.
ROBERT H. LIVA

BY

ATTORNEYS

Oct. 15, 1968  R. H. LIVA  3,405,564
PULLEY

Filed Oct. 13, 1966  3 Sheets-Sheet 3

INVENTOR.
ROBERT H. LIVA
BY
ATTORNEYS

United States Patent Office 3,405,564
Patented Oct. 15, 1968

3,405,564
PULLEY
Robert H. Liva, Rochester, N.Y., assignor to Xerox Corporation, Rochester, N.Y., a corporation of New York
Filed Oct. 13, 1966, Ser. No. 586,490
8 Claims. (Cl. 74—230.18)

ABSTRACT OF THE DISCLOSURE

An adjustable pulley with a variable effective radius having two mating interrelated pulley sides over which a continuous, expandable, circular member rides and a cable is passed. One side of the pulley is axially movable relative to the other and both have inclined inner surfaces. As the sides are moved relative to each other the effective inside radius of the pulley is changed. The expandable, circular member is placed around the effective circumference of the pulley and a cable or the like is fastened on the member. The driving or driven pulley is rotated at a velocity related by a factor of its effective radius to the linear velocity of the cable placed on the expandable circular member.

---

This invention relates to adjustable pulleys and specifically to adjustable pulley apparatus for varying the linear velocity at its effective circumference in relation to its rotational velocity.

In many operations it is essential for an object or instrument to be driven and maintained at an exacting velocity in relation to some other object or instrument. An example of an apparatus having such a requirement is a xerographic copier machine with a movable scanning mechanism to bring the light rays from its object plane to a moving photoreceptive surface with no relative motion between the data of the object being scanned and the photoreceptive surface onto which an image of the data is exposed. In an apparatus of this type as that disclosed in copending application Ser. No. 586,477 filed Oct. 13, 1966 in the name of D. G. Mallory, R. J. Ashton and R. H. Liva it is necessary that a document, remaining stationary on a copy holder at an object plane, be scanned by illumination lamps and a movable lens both in timed relation to each other and to a photoreceptive drum rotating as the image receptor of the optical system comprising: the document as an object, illumination lamps as the light source, and a lens to bring the illuminated object to the drum.

In this preferred embodiment of an exposure mechanism of a xerographic apparatus, an optical scanning or projection system scans the object to be reproduced and projects a flowing image of the object onto the rotating photoreceptive surface of the drum. The length of scan and the projection of the light rays of the object onto the surface of the drum in synchronism with the movement of said drum is controlled by cables attached to the lamps and the lens of the optical system and driven by pulleys shafted or otherwise connected to be rotated in fixed relation to the rotation of the drum. The scanning of the object which is placed in position on a fixed copy holder or platen is accomplished by means of a movable lens system which is moved relative to the copy holder in timed relation to the movement of the drum. Although any suitable means may be provided to illuminate the object on the copy holder, in this embodiment there is provided a lamp carriage having flourescent lights mounted thereon, which, when moved to traverse the copy holder in timed relation to the movement of the drum, provides the uniform illumination of the object to be reproduced.

The image reflected by said lamps passes through a lens which optically presents the image to the photoreceptive surface of the drum through a slot in a fixed light shield positioned adjacent to such drum. The lamp carriage and the laterally movable lens system are connected by cables to the pulleys of a scan control mechanism, the pulleys being rotated in one direction by any suitable means such as a ratchet mounted on the drum shaft, and rotated in the opposite direction to return them to their original starting position by spring means, the number of degrees through which the pulleys are rotated being controlled by suitable means to shorten or lengthen the travel of the lamp carriage and laterally movable lens system (see Rutkus Patent No. 3,062,095, issued Nov. 6, 1962).

Since the flow of the image to the photoreceptive surface requires a critically timed relationship, it is essential that the cables and their attachments travel at the proper velocity and the drive pulleys be of a specific inside or effective radius and held to a very close tolerance in order to effect proper velocity of the cables. If the effective radius is too small, the cables will move linearly more quickly for a given rotational velocity of the pulley than they would if the radius were larger. If there is a difference between the actual pulley size and the size required for a perfectly timed flowing image from the copy holder to the drum, the image placed on the drum will be either shortened or elongated depending on whether the pulley is larger or smaller, respectively, in effective radius. The difference in size of any given pulley in this system will of course be small, but nevertheless sufficient, to cause a commercially unacceptable image or copy of the original document. The invention here saves costs of manufacture and allows for far greater tolerances in the pulleys employed in a system of this sort or others requiring close tolerance inside diameters on drive pulleys, by providing for adjustment of the pulley after its incorporation into the apparatus in which it will be used.

It is therefore an object of this invention to provide an improved axially adjustable pulley.

Another object of this invention is to improve apparatus requiring pulleys of close tolerance diameters.

Yet another object of this invention is to improve means of adjusting linear speeds of cables traveling over pulley systems revolving at a constant rotational velocity.

A further object of this invention is to provide improved means for varying the rotational velocity of pulleys and shafts rotated by constant linear velocity drives.

Still another object of this invention is to improve means for adjusting speeds of scanning cables in copier apparatus.

These and other objects of the invention are attained by means of a pulley with an adjustable radius and expandable member wrapped thereon whereby when the two sides of the pulley are meshed together they are moved relative to each other along a shaft running axially therethrough and change the effective radius of the pulley thereby expanding or decreasing the diameter of the expandable member wrapped around said pulley whereby the linear speed of a cable running thereover is made adjustable for a constant rotational speed of the shaft on which the pulley rigidly mounted or the rotational speed is adjustable for a constant linear speed of a cable running thereon.

For a better understanding of the invention as well as other objects and further features thereof, reference is had to the following detailed description of the invention to be read in conjunction with the accompanying drawings wherein.

Figure 1:
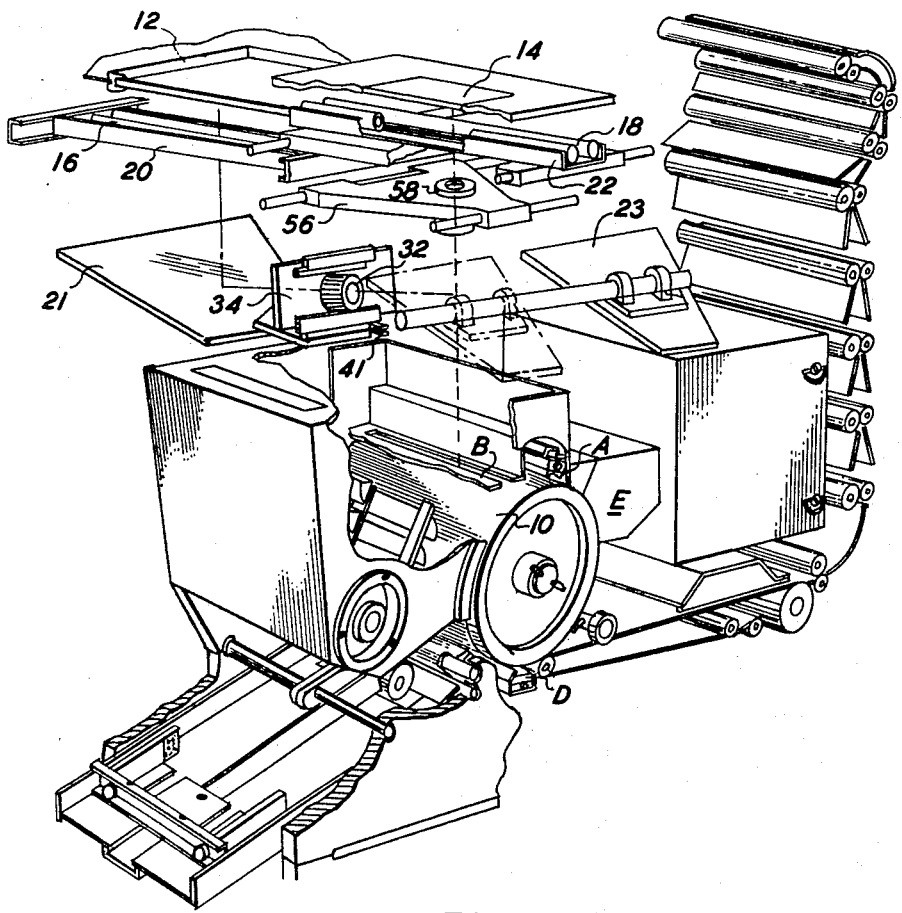
FIG. 1 is a right-hand perspective view of a xerographic apparatus with the covers removed and with the several parts shown schematically.

Referring now to the drawings, there is shown in FIG. 1 a xerographic enlarging and copying apparatus adapted to project light rays from objects at either of two platens to a photosensitive drum surface 10.

The xerographic apparatus comprises a xerographic drum including a photoconductive layer 10 on a conductive backing. The drum is mounted on a shaft journaled in a suitable frame to rotate in the direction indicated by the arrow causing the drum surface sequentially to pass a plurality of xerographic processing stations. For the purpose of the present disclosure, the several stations in the path of movement may be described functionally as follows:

A charging station located as indicated by reference character A at which a uniform electrostatic charge is deposited on a photoconductive surface 10. Next subsequent thereto in the path of motion of the drum is exposure station B at which a light pattern of copy to be reproduced is projected onto the photoconductive surface 10 to dissipate the charge in the exposed areas thereof. Thereby, a latent electrostatic image of copy to be reproduced is formed.

Adjacent to station B is developing station C whereat the latent image is developed by cascading a xerographic powder over it. Positioned next adjacent to station C is image transfer station D at which the powder image is electrostatically transferred from the surface 10 to a transfer material. The final station E is a cleaning station at which the photosensitive surface is brushed to remove residual xerographic powder and to prepare such surface for recharging and further exposure.

Figure 2:
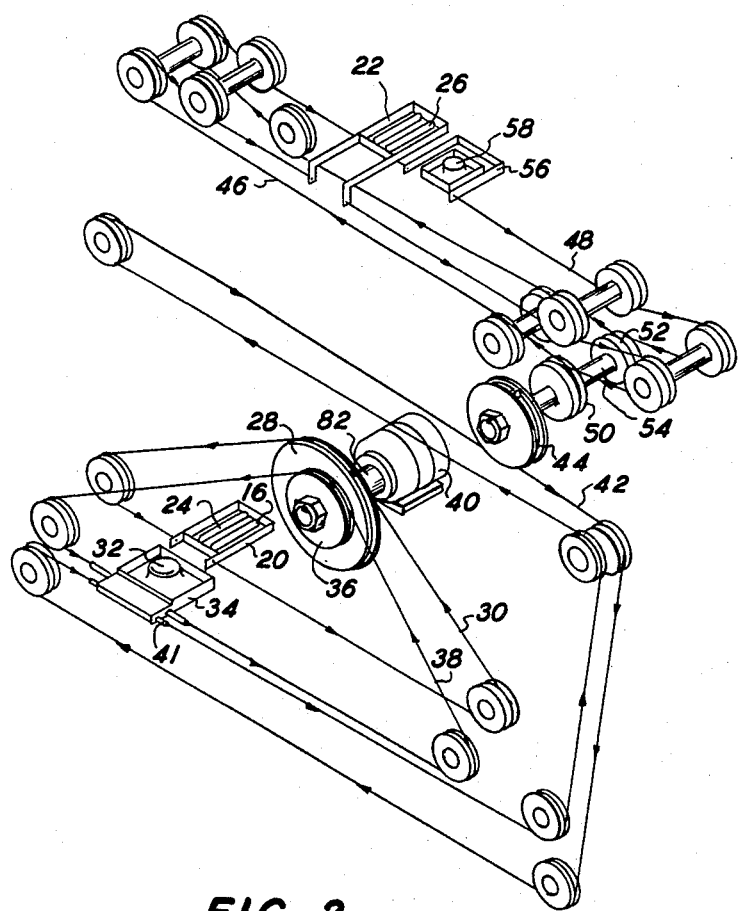
FIG. 2 is a schematic perspective view of the cable drive for the xerographic apparatus of FIG. 1 showing the scanning features of the optical system.

Referring now to the exposure station of a typical xerographic apparatus employing a scan exposure mechanism, and specifically to the cable drive for accomplishing the scan at the exposure station, we have, in FIG. 2, a motor driven cable drive system for the simultaneous scan of two separate platens comprising two illumination systems and two lens systems. The optics of the shutterless scan exposure mechanism provides a continuous flowing image of an object or document placed at an object plane of the given optical system to a photo-receptor placed at the image plane thereof.

The optical scanning or projection assemblies here comprise a first platen 12 and a second platen 14 which may consist of a transparent plate member such as, for example, a glass plate or the like. In the apparatus shown in FIG. 1, platen 12 is adapted to support a master of standard size data while platen 14 is adapted to support a document containing semi-micro data. The documents are placed face downward on the upper surface of the appropriate platen glass which is then uniformly illuminated and arranged in light-projecting relation to the moving light receiving surface 10 of the xerographic drum. Uniform lighting is provided by a pair of lamps attached to a slotted light shield mounted for movement to traverse the plane of each platen.

The lenses positioned between the respective platens and the photoreceptive surface are arranged for movement in a path to traverse the plane of the platen in timed relation to the movement of the light source of lamps. Thereby the document, supported by the platen, is scanned in timed relation to the movement of the light receiving surface 10 of the xerographic drum to project an image corresponding to the data on the document onto the surface of the drum.

The illumination for each of the scanning systems is provided by a pair of fluorescent lamps 16 for the copier mode and 18 for the semi-micro mode. The lamps are mounted in a lamp carriage 20 for the copier mode and 22 for the semi-micro mode. Each carriage is substantially U-shaped along the major portion of its length and has a pair of oppositely directed light reflectors secured thereon adjacent and parallel both to the side walls of the lamp carriage and to the longitudinal slot aperture formed in the bottom wall of said carriage. The carriage 20 of the copier mode has a slot aperture 24 therein while the carriage 22 for the semi-micro mode has a slot aperture 26 therein. Lamp carriage 20 moves in its scan to traverse platen 12. The movement is controlled by lamp scan pulley 28 and its drive cable 30 which is suitably attached to lamp carriage 20.

The optical path of the 1 to 1 magnification copier mode extends from the object plane of platen 12 through the slot 24 of the illumination carriage 20 to an object mirror 21 where it is reflected through lens 32 to an image mirror 23 which turns the path to expose the photosensitive surface 10 at exposure station B. The image mirror 23 may be moved out of the optical path of the copier mode to permit the light rays from the object at platen 14 to expose the photosensitive surface 10 located directly below the platen 14. The 1 to 1 magnification system in this preferred embodiment employs a folded optical system interposing mirrors along its optical path while the 3× system employs a direct optical path.

The laterally movable lens assembly of the copier mode consists of a suitable lens 32 positioned in lens carriage 34. The drive system for the scan of lens 32 is controlled by lens scan pulley 36 which is rigidly shafted to copier lamp scan pulley 28 preventing relative motion therebetween. Pulleys 28 and 36 operate in such a manner that they maneuver drive cables 30 and 38, respectively, such that the scan of the copier lamp carriage 20 and copier lens carriage 34 optically, conform to the movement of the photosensitive surface 10 of the drum, enabling a flowing image of the data placed on platen 12 to be reproduced at approximately 100% of its original size on the photoconductive surface 10 flowing past the image plane. The movement of the surface at the image plane is in direct timed relation to the scan by the copier lamps and lens of the document on platen 12. The lamp scan pulley 28 and lens scan pulley 36 are moved by a motor means 40 which enables them, through their respective cables 30 and 38, to maneuver lamp carriage 20 and lens carriage 34 at the proper scanning speed across the platen 12 and then to return at a more rapid speed to their original start position in a ready state for the next scan. For a more detailed description of the operation of the scanning system herein, see copending application Ser. No. 586,477 filed on Oct. 13, 1966 referred to above.

Attached to copier lens carriage 34 by a suitable means such as a cable clip 41 is the cable drive system of the entire semi-micro mode optical system. Its main drive cable 42 is fastened to the copier lens carriage and is connected to the main drive pulley 44 of the semi-micro mode which drives the cables for both the illumination and lens systems of the semi-micro mode.

The semi-micro illumination drive cable 46 and semi-micro lens scanning drive cable 48 are connected to their drive pulleys 50 and 52, respectively. These latter two pulleys are rigidly shafted to main pulley 44 by shaft 54 common to all three. The shaft 54 passes axially through the three pulleys and is journaled for rotation in a suitable frame of the machine incorporating the apparatus. Illumination cable 46 is suitably fastened to semi-micro illumination carriage 22 while lens cable 48 is suitably fastened to semi-micro lens carriage 56 which maintains semi-micro lens 58.

The semi-micro mode of this apparatus is comprised of a direct optical system. Therefore, all adjustments on focus, alignment, and magnification must be corrected for in the lens or lens mounting. A machine may be made capable of enlarging and copying original data that is magnified either 3.426 times or 2.753 times by merely changing the lenses in lens mounting 56 and the speed of the cable driving system by placing smaller diameter pulleys in position as pulleys 50 and 52. This causes faster motion of the semi-micro lamp carriage and lens mount, respectively, for the 2.753 magnification. These two magnifications are generally chosen because of the standard sizing of reduced data on semi-micro materials, but it is understood that any magnifications are within the scope and spirit of the invention herein.

The speed of the illumination and lens systems of the semi-micro mode is responsible for the flow of the image from platen 14 upon the photosensitive surface 10 below the optical system. Tolerance adjustments of the speed of the optical system of the semi-micro mode are corrected by adjustment of the semi-micro drive pulley 44 which is shown enlarged in FIGS. 3 and 4. This pulley clamps main drive cable 42 which is wrapped 360° around its effective perimeter. The effective or inside radius of this pulley, i.e., the distance from its geometric center to the farthest mating point 61 of its two halves, may be varied by moving one of the two sides 60 in a direction parallel to its central axis and relative to the other side 62. Each side has an inclined inner surface 64 permitting the variance of the inside diameter as the two sides are moved relative to each other. The shaft 54 passes through the central axis of the sides and has a threaded portion to accommodate the treads 65 of a threaded member such as a nut 66 used for adjusting the variable radius of the pulley.

The nut and side 60 are keyed together by key 68 adapted to ride in groove 69 of the shaft 54. The key 68 maintains the nut and side 60 in operable contact and in such a manner that they do not change relative distances to one another. Therefore, as nut 66 is rotated about threaded shaft 54, it moves inward or outward along the shaft pulling therewith key 68 and side 60. Side 62 is keyed in a fixed position with shaft 54 by key 70 to prevent relative rotation between the two. Side 62 is secured against axial movement along shaft 54 by a retaining ring 71, formed as an integral part of shaft 54, and by the force exerted by side 60. Side 62 may also be press fitted to shaft 54 or in any manner intimately formed therewith. Hence, as the nut 66 and the side 60 are moved along the shaft 54, the inside radius of the pulley is changed because of the meshing of the sides along the inclined faces 64. Nut 66 may be a castellated nut or in some other manner self-locking to prevent axial movement of it and side 60 after the adjustment is completed. Also, other means such as a cotter pin may be used.

Riding along inclined faces 64 of the two sides is an expandable circular member 72 in which the cable 42 is maintained. This member allows for greater adjustment for the inside radius of the pulley than would be practically available if the cable 42 alone rode on the inclined faces 64 of the sides of the pulley directly. This is so because the cable would likely catch in the meshing portion 74 of the two sides. The two sides 60 and 62 are formed by a method such as casting and are meshed together by rotating one in relation to the other approximately 60° although any rotation will suffice depending on the dimensions and frequency of the meshing cut-out segments. The circular member 72 is formed of a rigid resilient material such as steel and is arcuate in shape to conform generally to the circumference of the pulley. It is placed between the two sides and rides along the inclined faces 64 as the sides are moved relative to each other on its inner rounded surface 76. The outer surface 78 of the member 72 is arcuately recessed such that the radius is greater than that of its curved surface.

There is a spherical indentation in the outer surface of said member which is adapted to receive a ball 80 that is swedged on cable 42. Below the indentation is a hole drilled through the side of the member of a dimension suitable to accept a pin 82 used as part of the locking mechanism to secure the cable 42 to the member and prevent relative movement therebetween. Another hole which is perpendicular to the drilled hole and centered approximately through the center of the spherical indentation is formed completely through the member. This accepts a generally U-shaped spring 84 which is adapted to hook over the cable 72 on both sides of the ball 80 swedged thereon.

The clamping operation consists of placing the spring 84 over the cable 72, hooking it on both sides of the ball 80, and slipping pin 82 between the ball and bottom inner portion of the U-spring 84, passing the pin 82 through the hole drilled in the member 72. This locks the cable 42 to the member. A groove 83 is cut into both side portions of the pulley to receive the pin 82 when the member and cable are placed into operative position. This prevents rotational slippage of the member along the periphery of the pulley.

As the pulley is rotated, part of the cable wrapped around it will be removed from a contact position with the pulley or the member around it. It is important that the locking device not be on this portion of the cable or it will pull the member out of position. Therefore, when the cable is secured to prevent slippage by any locking mechanism, the pulley rotation is limited to the number of degrees that the cable contacts around the pulley inner circumference. If the cable is held by friction, however, this limitation does not exist.

The use of this pulley permits more flexible tolerances on the remainder of the scan system of the semimicro mode. The pulley 44 is caused to rotate by cable 42 which acquires a linear velocity from the rotational speed of pulley 36. The rotational velocity imparted to pulley 44 is related by a factor of its radius to the linear velocity of cable 42 by the relationship $w=v/r$ where $w$ is the rotational velocity, $v$ is the linear velocity and $r$ is the radius. The greater the radius, the lesser its rotational velocity from a fixed velocity of cable 42; the lesser the rotational velocity of said pulley, then the lesser the rotational velocity of shaft 54 and of pulleys 50 and 52 connected thereto and controlling the linear scan speed of the optical system of the semi-micro mode through the cables 46 and 48. Therefore, the corrections in the scan velocities of the optical system of the semi-micro mode may be controlled by the effective, or inside, radius of pulley 44. The relation between the illumination and lens aspects of the optical system of the semi-micro mode are controlled by the fixed dimensions of pulleys 50 and 52, respectively.

This flexibility in adjusting the operating speed of the optical system is an important feature because a slow scan by the optical system in relation to the speed of the photosensitive surface will cause the image at such surface to be reduced in size. Conversely a fast scan speed of the optical system will cause an elongated image at the slower moving image receptor. The function of pulley 44, therefore, is to permit proper scan speed of the semi-micro mode optical system to insure that the flow of the image from platen 14 will coincide exactly with the flow of the photosensitive surface 10.

Figure 4:
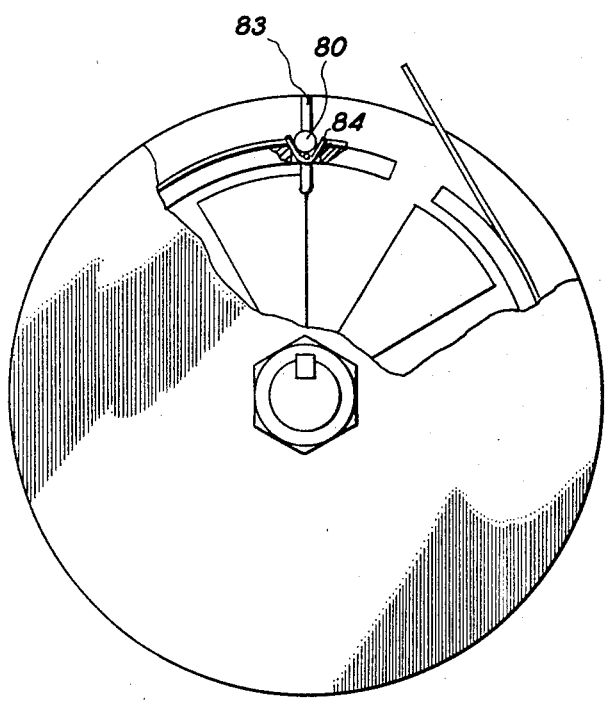
FIG. 4 is a side view with parts broken away to show the connection between cable and an adjustable drive pulley.
Figure 3:
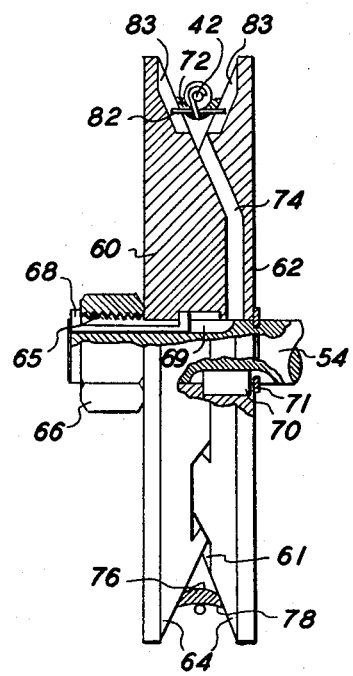
FIG. 3 is a front view, partly in section, of the adjustable drive pulley.

Pulleys 28 and 36 are constructed in the manner of the pulley shown in FIGS. 3 and 4 and similar to pulley 44. Both pulleys 28 and 36 have the same rotational velocity as the shaft 82 supplying power to them from motor 40. The linear velocity given to cable 30 by pulley 28 and cable 38 by pulley 36 are different because of the different radii of the two pulleys. The relationship between the speed of the two cables and therefore the radii of the two pulleys is such that the lamps 16 and lens 32 maintain the same optical relationship to each other and the photosensitive surface 10 as the lamps and lens traverse the platen 12. Corrections for mismatched speeds of the lamps and/or lens in relation to each other or more importantly the photoreceptive surface are achieved by adjusting each pulley in the same manner as hereinabove described for the adjustment of the semi-micro power pulley 44. By enlarging the effective radius of the pulley, the linear velocity of the cable passing thereover and the carriage attached to such pulley is slowed. Likewise, by reducing the effective radius of the pulley, the cable passing thereover and the carriage attached to the cable acquires a more rapid linear velocity even though the rotational velocity of the pulley remains constant. The cables 30 and 38 may be attached to pulleys 28 and 36, respectively, over an expandable circular member in the same manner as cable 42 is fastened to cable 44 as previously described. It is important in all three cases of fastening to make certain that the ball swedged to the cable is in such a position that, upon the rotation of the pulley to which it is fastened, it will not leave the pulley when the pulley is rotated. In other words it is on that portion of the circumference of the pulley over which the cable passes but does not leave as it is fed out in order to supply movement to the carriage which it manipulates.

It should be noted that the adjustable pulley may either be driven, as the pulley 44 is driven by the cable 42, or it may be the driver, as pulleys 28 and 36 drive cables 30 and 38, respectively. In the first instance the rotational velocity is varied for a constant linear velocity acquired from the cable driving the pulley and the adjusted rotational velocity is transmitted through a member such as the shaft 54 to in turn drive other systems. In the latter case the constant rotational velocity acquired by shaft 82 is transmitted into an adjustable linear velocity to drive whatever systems are attached thereto.

While the invention has been described with reference to the structures disclosed herein, it is not confined to the details set forth; and this application is intended to cover such modifications or changes as may come within the purposes of the improvements or the scope of the following claims.

What is claimed is:

1. An adjustable pulley adapted to vary the linear speed of a cable attached thereto in relation to the rotational speed of said pulley comprising a first side and a second side, each having generally inclined surfaces adapted to be meshed together with said surfaces facing each other, means to move said sides axially, relative one to the other, an expandable circular member in intimate contact with the inclined surfaces of said meshing sides and adapted to change in diameter as said sides are moved axially, said member adapted to maintain a cable in operative contact with said pulley such that, when said sides are moved toward each other, the circular member is expanded thereon increasing the effective radius between the cable and the axis of said pulley and when the sides are separated from each other the circular member is contracted and the effective radius between the cable and the pulley axis is reduced thereby effecting the relative linear speed of the cable with respect to the rotational speed of the pulley.

2. The apparatus of claim 1 wherein said expandable circular member has operatively associated therewith a means for attaching the cable thereto.

3. The apparatus of claim 1 wherein said sides have associated therewith a shaft concentric with the center axis of said sides, said first side integrally attached to said shaft, and said second side slidably mounted on said shaft, whereby said second side is axially movable along said shaft relative to said first side.

4. The apparatus of claim 3, wherein said second side has operatively associated therewith adjusting means adapted to move said second side axially along said shaft, and means to hold said adjusting means rigidly on said shaft.

5. The apparatus of claim 4 wherein said adjusting means comprises
   a threaded portion on the shaft,
   a threaded member adapted to engage said second side and adapted to ride on the threads of said shaft, and
   interlock means operatively associated with said second side and said threaded member to produce axial movement of said second side as said threaded member is rotated along said shaft.

6. The apparatus of claim 3, wherein said first side has associated therewith a retaining means mounted on said shaft and abutting said first side on the surface opposite its inclined surface preventing its axial movement along said shaft in the direction of said retaining means, and
   a locking mechanism holding said first side abutting said ring rigidly on said shaft to prevent independent motion between said side and said shaft.

7. The apparatus of claim 3 wherein said circular member has a cable associated therewith and means for attaching the cable thereto.

8. The apparatus of claim 7 wherein said means for attaching the cable to said circular member includes means for preventing slipping of the cable rotationally around said circular member.
   means for preventing slippage of said cable on said circular member in an axial direction, and
   means for preventing the slippage of said circular member rotationally around said pulley sides.

References Cited

UNITED STATES PATENTS

| | | |
|---|---|---|
| 2,168,835 | 8/1939 | Wells. |
| 2,214,106 | 9/1940 | Mayr. |
| 2,283,392 | 5/1942 | Shadrick. |
| 2,555,189 | 5/1951 | Fuchslocher. |
| 2,900,833 | 8/1959 | Wiseman. |

C. J. HUSAR, *Primary Examiner.*